United States Patent
Priester

(10) Patent No.: US 11,131,069 B2
(45) Date of Patent: Sep. 28, 2021

(54) TRENCH DRAIN ALIGNMENT SYSTEM

(71) Applicant: Jay R. Smith Mfg. Co., Montgomery, AL (US)

(72) Inventor: Donald Elwyn Priester, Deatsville, AL (US)

(73) Assignee: Jay R. Smith Mfg. Co., assumed name of Smith Industries, Inc., Montgomery, AL (US)

( * ) Notice: Subject to any disclaimer, the term of this patent is extended or adjusted under 35 U.S.C. 154(b) by 71 days.

(21) Appl. No.: 16/590,748

(22) Filed: Oct. 2, 2019

(65) Prior Publication Data
US 2021/0102348 A1     Apr. 8, 2021

(51) Int. Cl.
*E01F 5/00* (2006.01)
*E03F 5/06* (2006.01)
*E03F 3/04* (2006.01)

(52) U.S. Cl.
CPC ............... *E01F 5/00* (2013.01); *E03F 3/046* (2013.01); *E03F 5/06* (2013.01)

(58) Field of Classification Search
CPC .... E02B 5/00; E01F 5/00; E03F 3/046; E03F 3/06
USPC .......................... 404/2–5, 72; 405/118–123; 210/163–166, 170, 170.03
See application file for complete search history.

(56) References Cited

U.S. PATENT DOCUMENTS

| | | | |
|---|---|---|---|
| 4,257,716 A * | 3/1981 | Woodrow | E04D 13/0641 405/118 |
| 4,661,008 A | 4/1987 | Norihiro | |
| 5,000,621 A | 3/1991 | Beamer | |
| 5,256,000 A * | 10/1993 | Beamer | E03F 3/046 404/2 |
| 5,340,234 A * | 8/1994 | Rossi | E01C 11/227 405/119 |
| 6,220,784 B1 | 4/2001 | Bricker | |
| 6,273,640 B1 * | 8/2001 | Suazo | E02B 13/00 404/2 |
| 7,306,401 B1 * | 12/2007 | Linkogle | E02B 5/02 405/118 |
| 7,507,054 B2 * | 3/2009 | Fithian | E03F 3/046 264/219 |
| 7,736,092 B2 * | 6/2010 | Hodgekins | E04G 21/185 405/119 |
| 8,505,131 B2 * | 8/2013 | Doolittle | E03F 5/0408 4/613 |

(Continued)

*Primary Examiner* — Raymond W Addie
(74) *Attorney, Agent, or Firm* — Eric J. Sosenko; Jonathan P. O'Brien; Honigman LLP

(57) ABSTRACT

A trench drain section for connecting to a mating trench drain section and forming a trench drain system. The trench drain section includes a trough having sidewalls connected by a bottom wall and cooperating to define a channel. The trough further includes an open top, an open end and is connectable to another trench drain section. A pair of rails extend along the sidewalls and are secured by fasteners. Extending over the open top, a grate is supported on the rails. The drain section also includes an alignment bracket having first and second portions that are individually connectable with one of the fasteners. When one of first and second portions is connected with one of the fasteners, the other the portions of the alignment bracket extends from the trough through the open end thereof and is available for connecting to another trench drain section.

18 Claims, 4 Drawing Sheets

(56) References Cited

U.S. PATENT DOCUMENTS

| | | | |
|---|---|---|---|
| 9,127,462 B1* | 9/2015 | Malagrida | E04D 13/068 |
| 9,834,894 B1* | 12/2017 | Reed | E03F 5/0401 |
| 9,932,730 B2* | 4/2018 | Files, Jr. | E03F 3/046 |
| 10,132,070 B2* | 11/2018 | Madler | E03F 3/046 |
| 2002/0057945 A1* | 5/2002 | Dahowski | E03F 5/06 405/118 |
| 2004/0136785 A1* | 7/2004 | Gunter | E01C 11/227 405/118 |
| 2005/0025567 A1* | 2/2005 | Bricker | E03F 3/046 404/2 |
| 2008/0292396 A1* | 11/2008 | Shanley | E01C 11/222 404/2 |

\* cited by examiner

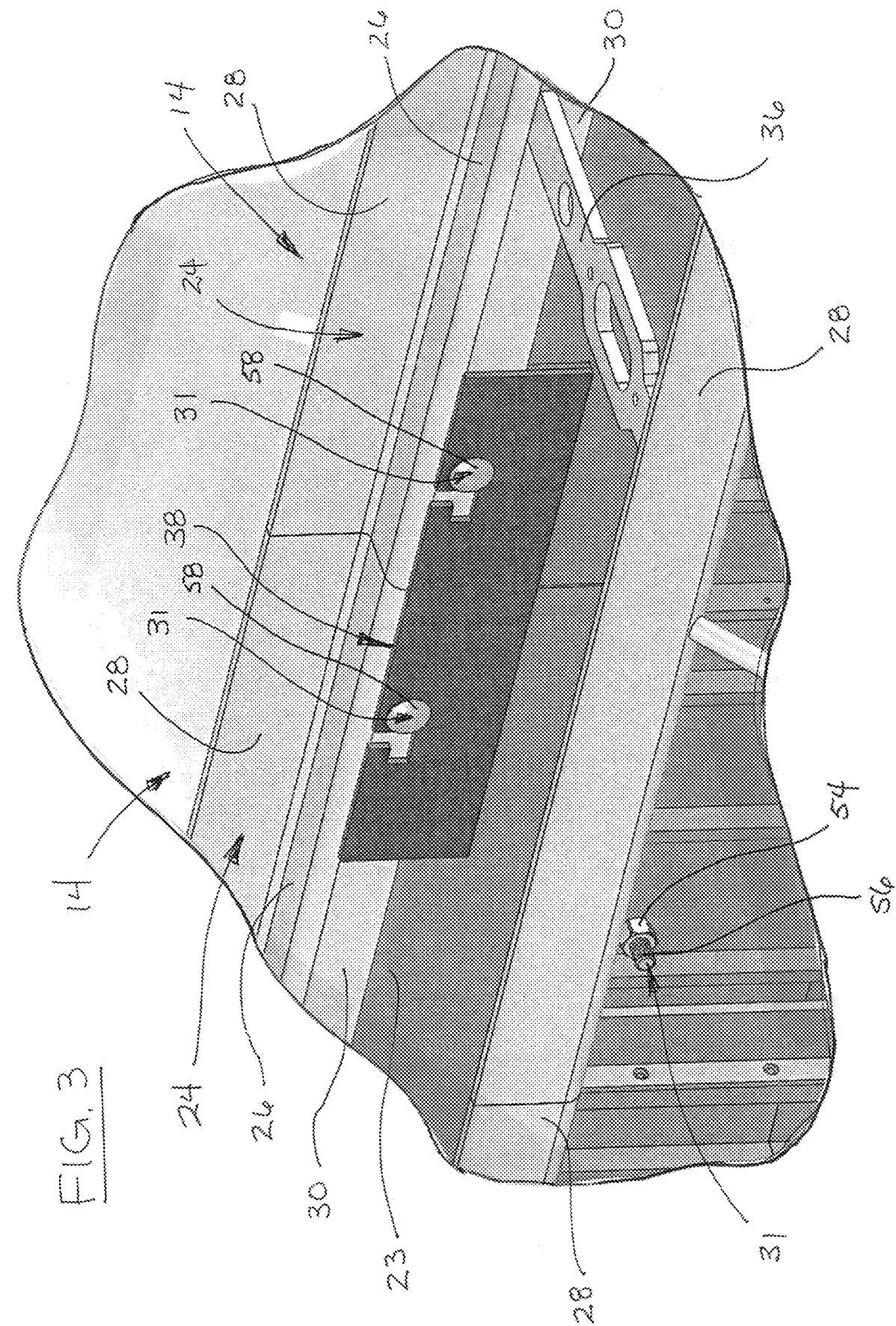

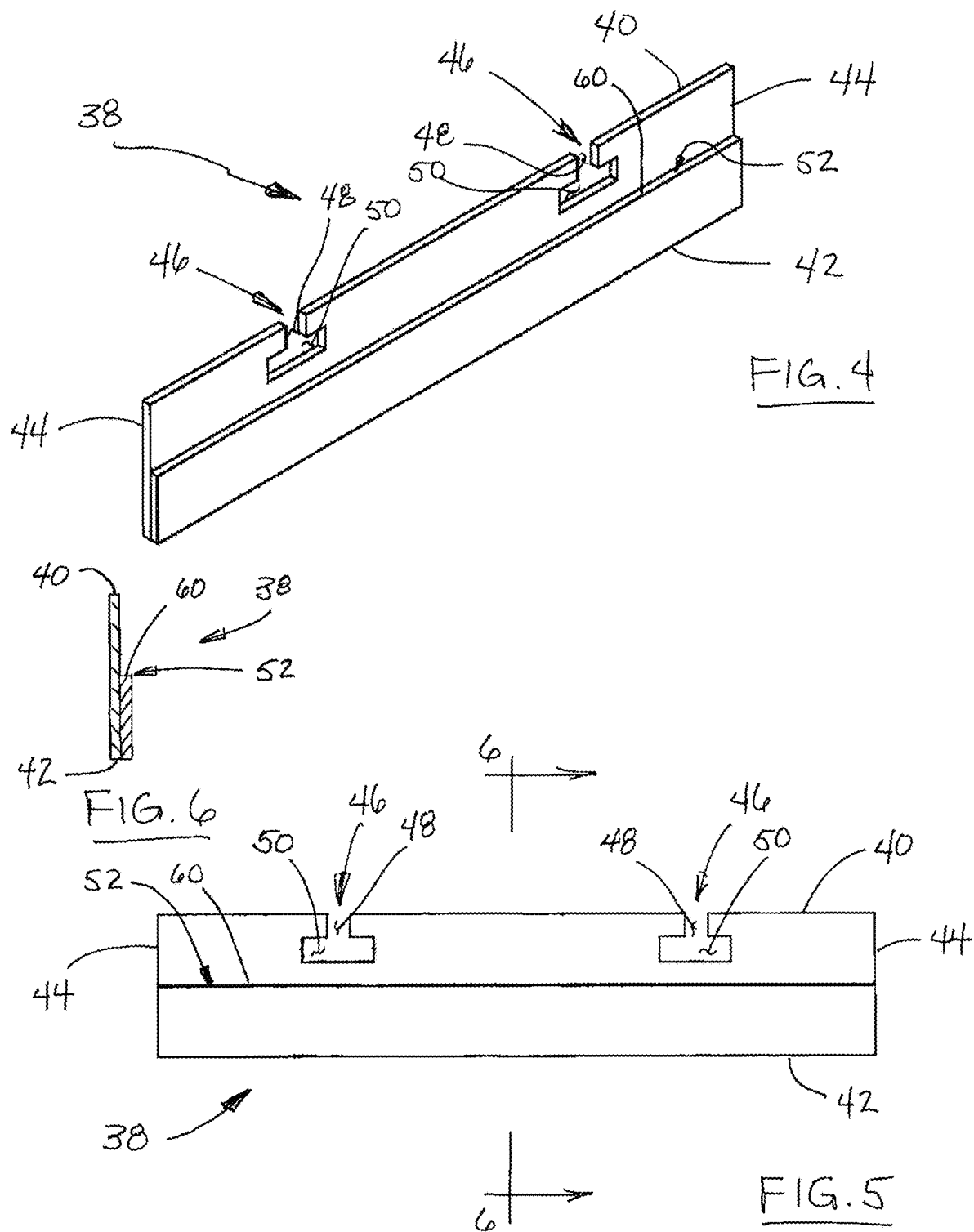

TRENCH DRAIN ALIGNMENT SYSTEM

BACKGROUND

1. Field of the Invention

The present invention generally relates to trench drains. More specifically, the invention relates to trench drain sections and systems having features for aligning adjacent sections of the trench drain system.

2. Description of Related Art

Trench drains are employed to drain water, such as rain water, from areas containing large amounts of impermeable or substantially impermeable surfaces, such as parking lots, runways, factory floors, walkways, entertainment venues, patios and many other applications.

The trench drain systems to which the present disclosure relates are those types that include a series of interconnected channel sections that are covered by a grate forming its upper surface. The channel sections progressively exhibit a small slope in their bottom surfaces to direct the flow of water toward a drain for disposal. Channel sections that are neutral or un-sloped may be interspersed between channel sections that exhibit a slope. A catch basin may be provided at the end of series of channel sections to receive the water flow and direct it into a storm water drain system. Alternatively, one of more of the channel sections may be provided with an outlet for coupling to the storm water drain system.

As noted above, the interconnected channel sections are surrounded on all sides by the impermeable material, which may be formed of concrete, asphalt, tile or another type of impermeable or substantially impermeable material. The tops of the channel sections have a removable grate, the openings of which permit water to flow into the channel section. It is important in the installation of trench drain systems that the channel sections be installed level at a predetermined height above the subsurface in order to insure the grate at the top of the channel is level and flush with the poured concrete or asphalt. It is also important that the joined channel sections be aligned with one another to ensure proper operation of the system and to provide an aesthetically pleasing final product installation. Thus, a key element to successful installation and optimum performance is maintaining proper alignment of the channel sections.

Depending on the style, the interconnected channel sections may be held together in various ways. In one construction, flanges on the end of adjacent channel sections are abutted with one another and clamped together by a connector that fits over flanges on the adjacent ends of the channel sections. In another construction, the adjacent ends of the channel sections may interconnect by way of male and female features or tongue and groove features, with or without a separate connector overfitting flanges on the ends of the adjacent channel sections.

In all of the constructions, however, alignment between adjacent channel sections is important and closely monitored during installation. As can be appreciated, establishing, monitoring and maintaining this alignment through the installation process can be time consuming.

SUMMARY

In view of the above, the present invention provides a trench drain section and trench drain system.

In one aspect of the invention, a trench drain section is provided for connecting to another trench drain section and forming a trench drain system. The trench drain section includes a trough, a grate and an alignment bracket. The trough has sidewalls connected by a bottom wall and cooperating to cooperating to define a lengthwise extending channel within the trough. The trough further has an open top, opposite of the bottom wall, and at least one open end connectable to the open end of another trench drain section. A pair of rails extend along a top surface of the sidewalls and are secured thereto by releasable fasteners. The grate is supported by the rails of the trough and extend between the sidewalls of the trough over the open top. The alignment bracket includes a first portion configured to be connectable with one of the fasteners, a second portion also configured to be connectable with one of the fasteners, whereby, when one of first and second portions is connected with one of the fasteners, the other of the first and second portions of the alignment bracket extends from the trough, through the open end thereof, and is available for connecting to another trench drain section.

In another aspect of the invention, a trench drain system is provided. The trench drain system includes a first channel section, a second channel section, and an alignment bracket. Each of the first and second channel sections including a trough and a grate. The trough includes sidewalls connected by a bottom wall and which cooperate to define a lengthwise extending channel. The trough further includes an open top, opposite of the bottom wall, and at least one open end. The grate is supported by the trough and extends between the sidewalls of the trough over the open top. An alignment bracket extends between the first and second channel sections. One end of the alignment bracket is connected to one of the sidewalls of the first channel section at a first position. An opposing end of the alignment bracket is connected to one of the sidewalls of the second channel section at a second position. The first and second positions correspond with one another such that the grate of the first drain channel section is aligned with the grate of the second drain channel section.

In a further aspect, each of the grates define a top surface that, when aligned, are generally co-planar with one another.

In an additional aspect, the first position is located a first distance from an upper end of the sidewall to which the alignment bracket is connected, the second positon is a second distance from an upper end of the sidewall to which opposing end the alignment bracket is connected, and the first and second distances are equal.

In yet another aspect, the first and second positions are defined by protrusions extending from the respective sidewalls into the respective channels.

In still a further aspect, the protrusions are fasteners extending through the respective sidewalls.

In an additional aspect, the fasteners have a head and a shaft extending between the head and the respective sidewall.

In still another aspect, the fasteners are threaded bolts.

In yet a further aspect, side rails are secured by the fasteners to upper ends of the sidewalls and the side rails support the grate.

In yet an additional aspect, the fasteners are configured to be at least one of tightened and loosened with respect securing of the side rails to the sidewalls.

In another aspect, portions of the alignment bracket define a first slot and a second slot, the first and second slots being spaced apart from one another along a longitudinal common side edge of the alignment bracket.

In still a further aspect, the first and second slots each include a transverse portion extending transversely from the common side edge and a longitudinal portion extending directionally with the common side edge.

In an additional aspect, the longitudinal portions are spaced apart from the common side edge.

In yet another aspect, the transverse portions and the longitudinal portions define one of a T-shape and an L-shape.

In a further aspect, the alignment bracket includes a stepped shoulder extending along at least a portion of the length of the alignment bracket between opposing ends thereof.

In yet an additional aspect, the stepped shoulder is spaced apart from the common side edge and extends from a side surface of the alignment bracket.

In another aspect, the stepped shoulder defines a surface that is parallel with a surface defined by the common side edge.

In still a further aspect, a second alignment bracket extends between the first and second drain channel sections, wherein one end of the second alignment bracket is connected to an opposite one of the sidewalls of the first drain channel section at a first position, an opposing end of the second alignment bracket is connected to the opposite one of the sidewalls of the second drain channel section at a second position, and the first and second positions on the opposite ones of the sidewalls correspond with one another such that the grate of the first drain channel section is aligned with the grate of the second drain channel section.

In another aspect, the first and second portions respectively define first and second slots in the alignment bracket, the first slot defining a first shape and the second slot defining a second shape, the first and second shapes being identical to one another.

In an additional aspect, the alignment bracket further includes a stepped shoulder extending along at least a portion of the length of the alignment bracket between opposing ends thereof, the stepped shoulder defining a step surface engageable with the a corresponding surface of one of the rails thereby positioning the alignment bracket relative to the one of the rails.

Further objects, features and advantages of this invention will become readily apparent to persons skilled in the art after review of the following description, including the claim, with reference to the drawings that are appended to and form a part of this specification.

BRIEF DESCRIPTION OF THE DRAWINGS

FIG. 3 is a partial interior perspective view, as generally enclosed by line 3-3, of the trench drain system seen in FIG. 1 with the grate removed FIG. 4 is a perspective view of the alignment bracket seen in FIG. 3.

FIG. 5 is a plan view of the alignment bracket.

FIG. 6 is a cross-sectional view, generally along line 6-6 in FIG. 5, of the alignment bracket.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an access is designated in the figures. An axial surface is therefore one that faces in the axial direction. In other words, an axial surface faces in a direction along the central axis. A radial surface therefore faces radially, generally away from or toward the central axis.

Figure 1:
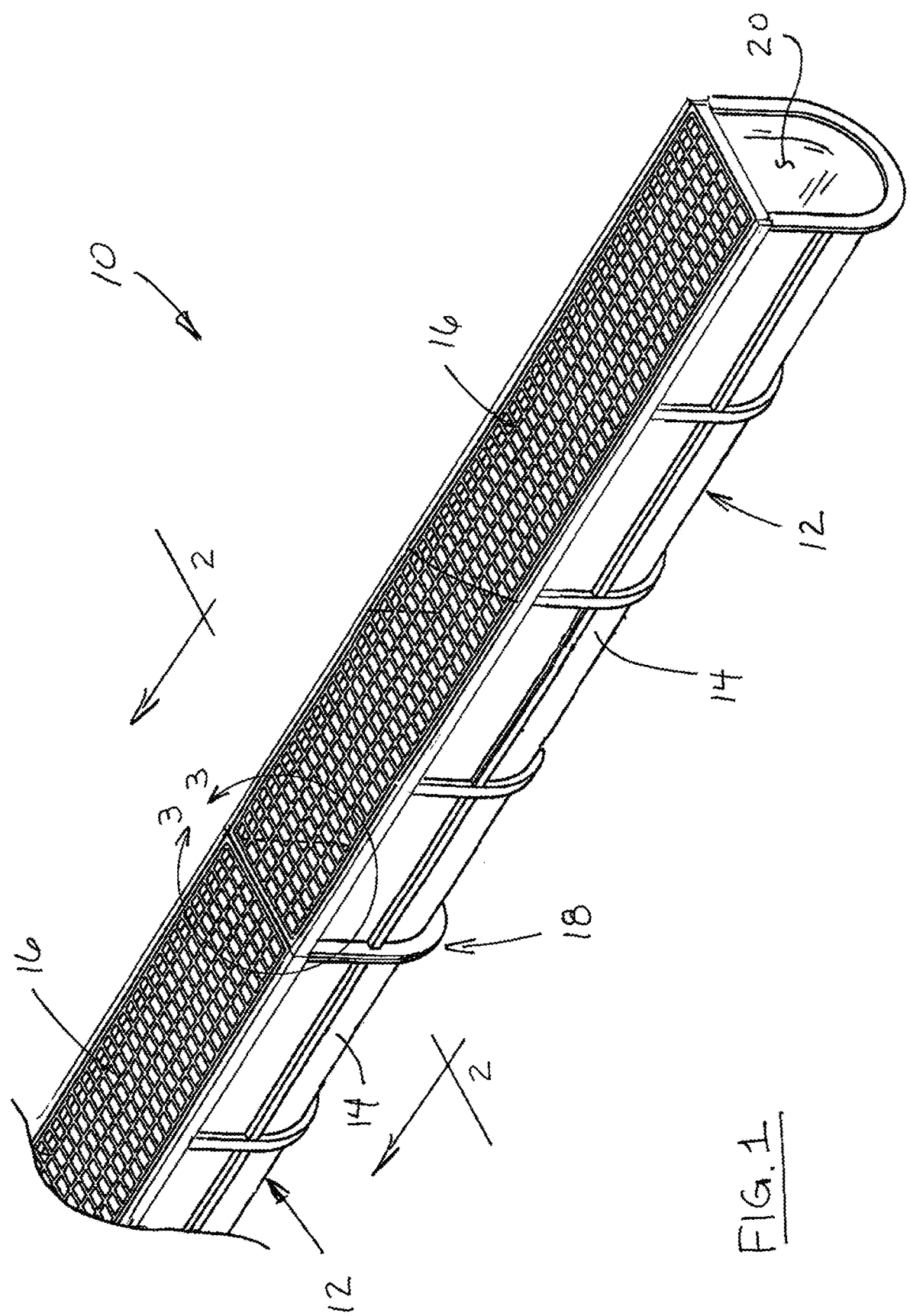
FIG. 1 is a partial perspective view of a trench drain system embodying the principles of the present invention.

Referring now to the drawings, trench drain channel sections forming a trench drain channel system embodying the principles of the present invention is generally illustrated in FIG. 1 and designated at 10. The trench drain system 10 includes a series of interconnected drain channel sections 12, generally connected end-to-end. Each channel section 12 includes a trough 14 that supports a grate 16, which forms the upper surface of the channel section 12. As seen in FIG. 1, when installed, the adjacent ends of two channel sections 12 are connected together, which is designated at 18. Any number of channels 12 may be connected together to form the drain system 10 in the appropriate length for the given application and installation.

During the installation process, a trench is initially formed at the installation site. The interconnected channel sections 12 are positioned in the trench and may be supported by yokes (not shown), also sometimes referred to as chairs, having legs that are height adjustable. The legs may be formed by a threaded bar and include a foot that is inserted into the ground to stabilize the yoke and channel section 12. Alternatively or additionally, rebar or other types of support members (not shown) may be attached to the channel sections 12 by clips or other means and used to support the channel sections 12 at the appropriate height and during the remainder of the installation process. The above note yokes and support members may be of common and well-known constructions to those skilled in art of trench drain systems. For this reason, such supporting features and structures are not discussed in greater detail herein.

The trough 14 of each channel section 12 is a generally U-shaped, elongated structure that is open in the upward direction and at both ends. As such, the interior surfaces of the troughs 14 collectively form a channel 20 for collecting water received through the grate 16 and directing it to a storm water drainage system (not shown). To facilitate the transfer of water to the storm water drainage system, the bottom of the interior surfaces of each trough 14 may exhibit a slope from one end to the other, and the next adjacent trough 14 may exhibit a slope continuing the slope of the previous trough 14. As such, each trough 14 is similar in construction, but has a specific location in the series of troughs 14 to establish the slope over the length of the installation of a particular trench drain system 10. It should be noted, however, that one or more troughs 14 incorporated into the trench drain system 10 may be neutral or un-sloped and interspersed between troughs 14 that exhibit a slope.

Figure 2:
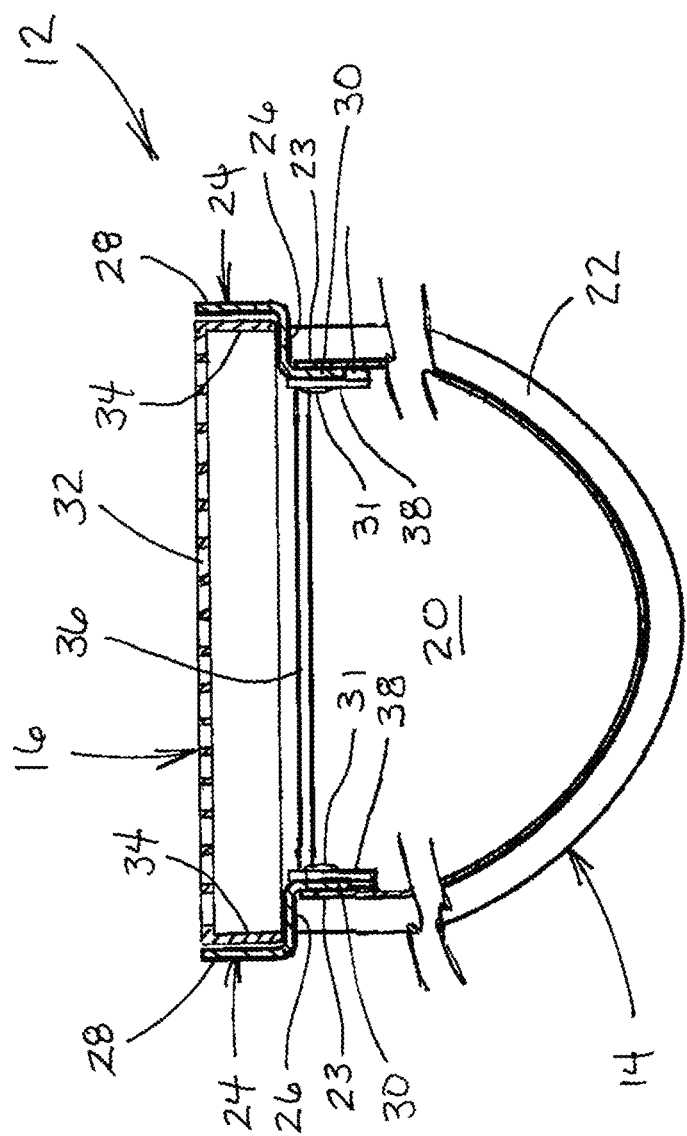
FIG. 2 is partial cross-sectional view, generally taken along line 2-2, of the trench drain system seen in FIG. 1.

Referring now to FIG. 2, the general U-shaped cross-section of the trough 14 of the channel section 12 is seen therein. The ends of each trough 14 are provided with flanges 22 that are configured to matingly engage with corresponding flanges 22 of the adjacent trough 14. The flanges 22 may be flat, as seen in FIGS. 1 and 2, or may be formed corresponding engagement features, such as male and female or tongue and groove features.

The adjacent channel sections 12 may be held together in a variety of ways. In one construction, flanges 22 on the ends of the adjacent troughs 14 are abutted with one another and clamped together by a U-shaped connector, not shown, press-fitted about the flanges 22 to retain the flanges 22 in their abutted relationship.

The upper ends 23 of the trough 14, the ends of the legs of the U-shape, include end rails 24 that extend the length of the trough 14 and channel section 12. As seen in FIGS. 2 and 3, the end rails 24 are provided in a reverse angle iron configuration with the middle leg 26 of the profile forming a horizontal support surface for the grate 16, the upwardly extending leg 28 of the profile defining an outboard lip or rim of the channel section 12 and the downwardly extending leg 30 of the profile forming an inboard support along the inner surface of the upper ends of the trough 14. The end rails 24 may be secured to the ends 23 of the trough 14 with mechanical fasteners 31, such as threaded fasteners, rivets or other means.

As previously mentions, for each channel section 12, the grate 16 is supported on and extends between the middle legs 26 of the end rails 24. The grate 16 includes an upper wall 32 provided with slots or openings that permit water to pass through the upper wall 32 and into the channel 20 of the trough 14. The upper wall 32 of the grate 16 is bounded about its perimeter by a peripheral wall 34, the lower ends of side portions of which rest upon the middle legs 26 of the side rails 24, interiorly of the upwardly extending legs 28. The grate 14 may be attached to the side rails 24 by fasteners or may freely rest upon the side rails 24.

The channel sections 12 may also include cross members 36 extending between the side rails 24 at various locations along the length of the of the channel section 12. Such cross members 36 provide support to the sides of the trough 14 and prevent inward bowing thereof during backfilling of aggregate or soil about the sides of the channels sections 12 during installation.

As best seen in FIG. 3, the trench drain system 10 includes alignment brackets 38 to facilitate both the axial and vertical alignment of the adjacent channel sections 12. The alignment brackets 38 extend between the adjacent channel sections 12 and, in cooperation with the fasteners 31 that secure the side rails 24 to the upper ends 23 of the troughs 14, align, interconnect and secure the adjacent channel sections 12 together.

The alignment bracket 38 seen in FIG. 3 is shown in greater detail in FIGS. 4-6. As seen latter figures, the alignment bracket 38 is an elongate, flat bar-like structure having opposed upper and lower edges 40, 42 and opposed ends 44. Formed in the upper edge 40 are a pair of T-slots 46. Each T-slot 46 includes a center leg 48 extending downward from the upper edge 40 to a transverse leg 50. As such, the transverse legs 50 of the T-slots are parallel to, but spaced apart from, the upper edge 42. The T-slots 46 are spaced apart by a distanced corresponding to the location of the fastener 31 that is closest to the end of the trough 14. More specifically, the spacing between the T-slots 46 is twice the distance from the end of the trough to the last fastener 31 on the end of the trough 14. Accordingly, the spacing between the T-slots 46 of the alignment bracket 38 corresponds to the distance between the fasteners 31 on the ends of the adjacent channel sections 12 that are to be joined together.

The alignment bracket 38 further includes a step 52 that extends the full length of the alignment bracket 38. While illustrated as being continuous over the length of the alignment bracket 38, the step 52 may be discontinuous and extend only over part of the length of the alignment bracket 38. If discontinuous, the step 52 is provided in at least two parts, with one part located on each half of the alignment bracket 38. Furthermore, the step 52 is located between the upper and lower edges 40, 42 at a position below and spaced apart from the T-slots 46. In forming the step 52, the step 52 may constructed of an additional piece of stock material secured and fixedly attached to the remainder of the alignment bracket 38 or the step 52 may be unitarily formed in one piece with the remainder of the alignment bracket 38.

During use of the alignment bracket 38, the fastener 31 on the end of the trough 14 is loosened relative to the end rail 24 and trough 14. The fastener 31, which is illustrated as a nut 54 and bolt 56 fastener, is loosened by unscrewing the nut 54, positioned on the exterior side of the trough 14, relative to the bolt 56. With the nut 54 loosened, the bolt 56 may be slid slightly inward so that the head 58 of the bolt 56 is separated, inwardly, from the inner surface of the downward leg 30 of the end rail 24. Spaced in this manner, the bolt 56 of the fastener 31 is slid downwardly into the downward leg 48 of the T-slot 46 then transversely toward one end of the transverse leg 50. The above procedure is simultaneously performed with respect to the end of the adjacent trough 14. Once positioned, the fastener 31 on one trough 14 is then tightened, and afterward, the fastener of the adjacent trough 14 is tightened.

Notably, the step 52 includes an upper surface 60 that is spaced from the transverse leg 50 of the T-slot 46 such that the upper surface 60 engages a downward facing surface 60 of the downward leg 30 of the end rail 24 mounted to the trough 14. Through this engagement of the step 52 with the end rail 24 of one channel section 12 and a corresponding engagement of the step 52 with the end rail 24 of the adjacent channel section 12, two channel section 12 are aligned with one another. Once aligned, the nuts 54 are tightened so as to secure the alignment bracket 38 to each of the channel sections 12 and to retain the channel sections 12 in alignment with one another for the remainder of the installation of the trench drain system 10.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not of limitation.

What is claimed is:

1. A trench drain system comprising:
   a first drain channel section;
   a second drain channel section;
   each of the first and second drain channel sections including a trough and a grate, the trough having sidewalls connected by a bottom wall, the sidewalls and bottom wall cooperating to define a lengthwise extending channel within the trough, the trough further having an open top opposite of the bottom wall and at least one open end, the grate being supported by the trough and extending between the sidewalls of the trough over the open top; and
   an alignment bracket extending between the first and second drain channel sections, one end of the alignment bracket being connected to one of the sidewalls of the first drain channel section at a first position, an opposing end of the alignment bracket being connected to one of the sidewalls of the second drain channel section at a second position, the first and second positions corresponding with one another such that the grate of the first drain channel section is aligned with the grate of the second drain channel section, portions of the alignment bracket defining a first slot and a second slot, the first and second slots being spaced apart from one another along a longitudinal common side edge of the alignment bracket and extending from the common side edge.

2. The trench drain system according to claim 1, wherein each of the grates define a top surface, the grates being aligned with the top surfaces thereof being generally co-planar with one another.

3. The trench drain system according to claim 1, wherein the first position is located a first distance from an upper end of the sidewall to which the alignment bracket is connected, the second positon being a second distance from an upper end of the sidewall to which opposing end the alignment bracket is connected, the first distance being equal to the second distance.

4. The trench drain system according to claim 1, further comprising a second alignment bracket extending between the first and second drain channel sections, one end of the second alignment bracket being connected to an opposite one of the sidewalls of the first drain channel section at a first position, an opposing end of the second alignment bracket being connected to the opposite one of the sidewalls of the second drain channel section at a second position, the first and second positions on the opposite ones of the sidewalls corresponding with one another such that the grate of the first drain channel section is aligned with the grate of the second drain channel section.

5. The trench drain system according to claim 1, wherein the first and second positions are defined by protrusions extending from the respective sidewalls into the respective channels.

6. The trench drain system according to claim 5, wherein the protrusions are fasteners extending through the respective sidewalls.

7. The trench drain system according to claim 6, wherein the fasteners have a head and a shaft extending between the head and the respective sidewall.

8. The trench drain system according to claim 7, wherein the fasteners are threaded bolts.

9. The trench drain system according to claim 6, further comprising side rails secured by the fasteners to upper ends of the sidewalls, the side rails supporting the grate.

10. The trench drain system according to claim 6, wherein the fasteners are configured to be at least one of tightened and loosened with respect securing of the side rails to the sidewalls.

11. The trench drain system according to claim 4, wherein the alignment bracket includes a stepped shoulder extending along at least a portion of the length of the alignment bracket between opposing ends thereof.

12. The trench drain system according to claim 11, wherein the stepped shoulder is spaced apart from the common side edge and extends from a side surface of the alignment bracket.

13. The trench drain system according to claim 12, wherein the stepped shoulder defines a surface that is parallel with a surface defined by the common side edge.

14. A trench drain system comprising:
a first drain channel section;
a second drain channel section;
each of the first and second drain channel sections including a trough and a grate, the trough having sidewalls connected by a bottom wall, the sidewalls and bottom wall cooperating to define a lengthwise extending channel within the trough, the trough further having an open top opposite of the bottom wall and at least one open end, the grate being supported by the trough and extending between the sidewalls of the trough over the open top; and
an alignment bracket extending between the first and second drain channel sections, one end of the alignment bracket being connected to one of the sidewalls of the first drain channel section at a first position, an opposing end of the alignment bracket being connected to one of the sidewalls of the second drain channel section at a second position, the first and second positions corresponding with one another such that the grate of the first drain channel section is aligned with the grate of the second drain channel section, the first and second positions being defined by protrusions extending from the respective sidewalls into the respective channels; and
portions of the alignment bracket defining a first slot and a second slot, the first and second slots being spaced apart from one another along a longitudinal common side edge of the alignment bracket, the first and second slots each including a transverse portion extending transversely from the common side edge, the first and second slots each also including a longitudinal portion extending directionally with the common side edge.

15. The trench drain system according to claim 14, wherein the longitudinal portions are spaced apart from the common side edge.

16. The trench drain system according to claim 15, wherein the transverse portions and the longitudinal portions define one of a T-shape and an L-shape.

17. Trench drain section for connecting to a mating trench drain section and forming a trench drain system, the trench drain section comprising:
a trough, the trough having sidewalls connected by a bottom wall, the sidewalls and bottom wall cooperating to define a lengthwise extending channel within the trough, the trough further having an open top opposite of the bottom wall and at least one open end connectable to an open end of another trench drain section, a pair of rails extending along a top surface of the sidewalls, the rails being secured to the sidewalls by releasable fasteners;
a grate, the grate supported by the rails of the trough and extending between the sidewalls of the trough over the open top; and
an alignment bracket, a first portion of the alignment bracket configured to be connectable with one of the releasable fasteners, a second portion of the alignment bracket configured to be connectable with one of the releasable fasteners, whereby when one of first and second portions of the alignment bracket is connected with one of the releasable fasteners, the other of the first and second portions of the alignment bracket extends from the trough through the open end thereof and is available for connecting to another trench drain section, the alignment bracket further includes a stepped shoulder extending along at least a portion of the length of the alignment bracket between opposing ends thereof, the stepped shoulder defining a step surface engageable with the a corresponding surface of one of the rails thereby positioning the alignment bracket relative to the one of the rails.

18. The trench drain section according to claim 17, wherein the first and second portions respectively define first and second slots in the alignment bracket, the first slot defining a first shape and the second slot defining a second shape, the first and second shapes being identical to one another.

\* \* \* \* \*